United States Patent
Lee et al.

(10) Patent No.: US 11,589,257 B2
(45) Date of Patent: Feb. 21, 2023

(54) METHOD FOR PERFORMING A LOGICAL CHANNEL PRIORITIZATION (LCP) PROCEDURE BY A RELAY UE IN WIRELESS COMMUNICATION SYSTEM AND A DEVICE THEREFOR

(71) Applicant: LG Electronics Inc., Seoul (KR)

(72) Inventors: Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 16/981,137

(22) PCT Filed: Apr. 10, 2018

(86) PCT No.: PCT/KR2018/004204
§ 371 (c)(1),
(2) Date: Sep. 15, 2020

(87) PCT Pub. No.: WO2019/198838
PCT Pub. Date: Oct. 17, 2019

(65) Prior Publication Data
US 2021/0058820 A1   Feb. 25, 2021

(51) Int. Cl.
*H04W 72/12* (2009.01)
*H04W 28/02* (2009.01)
(Continued)

(52) U.S. Cl.
CPC ... *H04W 28/0268* (2013.01); *H04W 72/1268* (2013.01); *H04W 72/1284* (2013.01); *H04W 80/02* (2013.01); *H04W 88/04* (2013.01)

(58) Field of Classification Search
CPC ......... H04W 28/0268; H04W 72/1268; H04W 72/1284; H04W 80/02; H04W 88/04; H04W 84/047; H04W 72/02
See application file for complete search history.

(56) References Cited

U.S. PATENT DOCUMENTS 11,160,108 B2 * 10/2021 Xu .................... H04W 74/0808
2018/0069618 A1 * 3/2018 Loehr ............... H04W 72/1263
(Continued)

FOREIGN PATENT DOCUMENTS

WO   WO2015046787   4/2015
WO   WO2017026844   2/2017
(Continued)

OTHER PUBLICATIONS

PCT International Search Report and Written Opinion in International Application No. PCT/KR2018/004204, dated Jan. 10, 2019, 11 pages.

*Primary Examiner* — Lakeram Jangbahadur
(74) *Attorney, Agent, or Firm* — Fish & Richardson P.C.

(57) ABSTRACT

The present invention relates to a wireless communication system. More specifically, the present invention relates to a method and a device for performing a LCP procedure by a Relay UE in wireless communication system, the method comprising: performing, by the relay UE, a LCP procedure for generating MAC PDU by considering a priority of a first logical channel of a remote UE and a priority of a second logical channel of the relay UE; and transmitting the MAC PDU to a network, wherein if the priority of the second logical channel is equal to the priority of the first logical channel, data from the second logical channel of the relay UE is prioritized over data from the first logical channel of the remote UE during the LCP procedure.

8 Claims, 11 Drawing Sheets

(51) Int. Cl.
*H04W 72/1268* (2023.01)
*H04W 80/02* (2009.01)
*H04W 88/04* (2009.01)

(56) References Cited

U.S. PATENT DOCUMENTS

| | | | |
|---|---|---|---|
| 2018/0206257 A1* | 7/2018 | Lee | H04W 28/0278 |
| 2018/0234995 A1* | 8/2018 | Jung | H04W 72/1278 |
| 2018/0255499 A1* | 9/2018 | Loehr | H04W 76/23 |

FOREIGN PATENT DOCUMENTS

| | | |
|---|---|---|
| WO | WO2017034232 | 3/2017 |
| WO | WO2017051494 | 3/2017 |

* cited by examiner

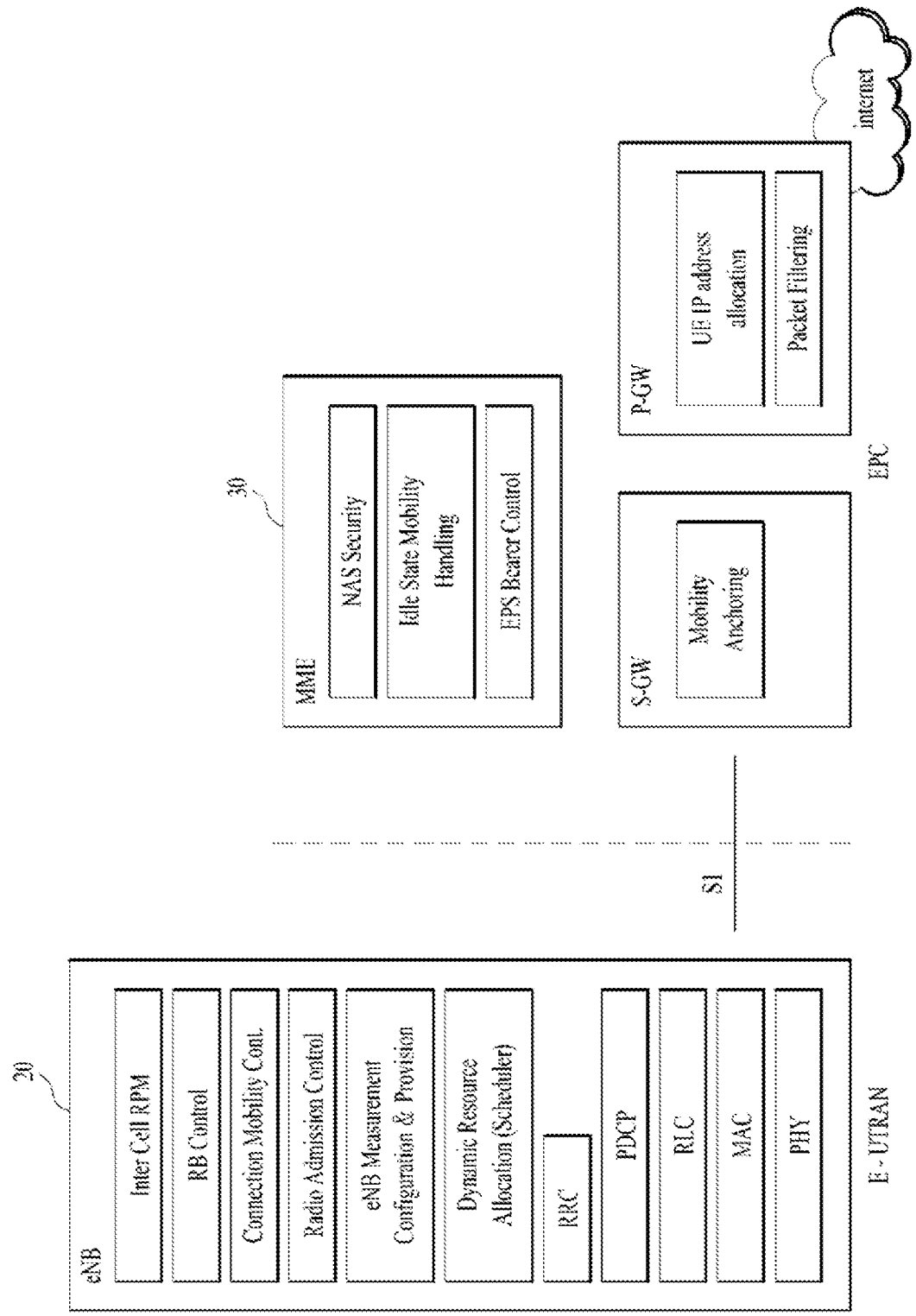

METHOD FOR PERFORMING A LOGICAL CHANNEL PRIORITIZATION (LCP) PROCEDURE BY A RELAY UE IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/004204, filed on Apr. 10, 2018, the disclosure of which is incorporated by reference in its entirety.

TECHNICAL FIELD

The present invention relates to a wireless communication system and, more particularly, to a method for performing a logical channel prioritization (LCP) procedure by a Relay UE in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for performing a LCP procedure by a Relay UE in wireless communication system.

The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

In this invention, it is presented about models the relay UE performs a LCP procedure for generating a MAC PDU including data from the relay UE and data from the remote UE. When the data of relay UE and remote UE are multiplexed within one DRB or SRB, in order to prevent the data or signaling of relay UE from being deprioritized, a new priority definition between the data or signaling of the remote UE and the data or signaling of the relay UE is needed.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2b is a block diagram depicting architecture of a typical E-UTRAN and a typical EPC;

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
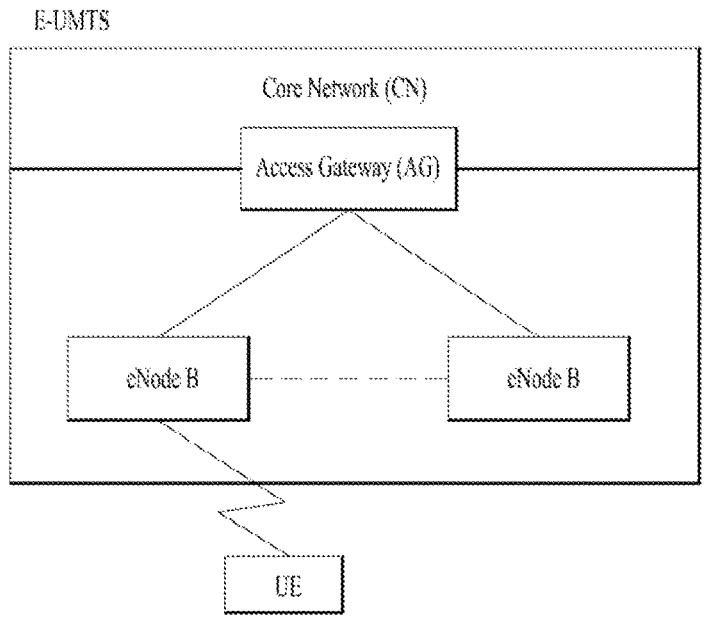
FIG. 1 is a diagram showing a network structure of an Evolved Universal Mobile Telecommunications System (E-UMTS) as an example of a wireless communication system.
Figure 2A:
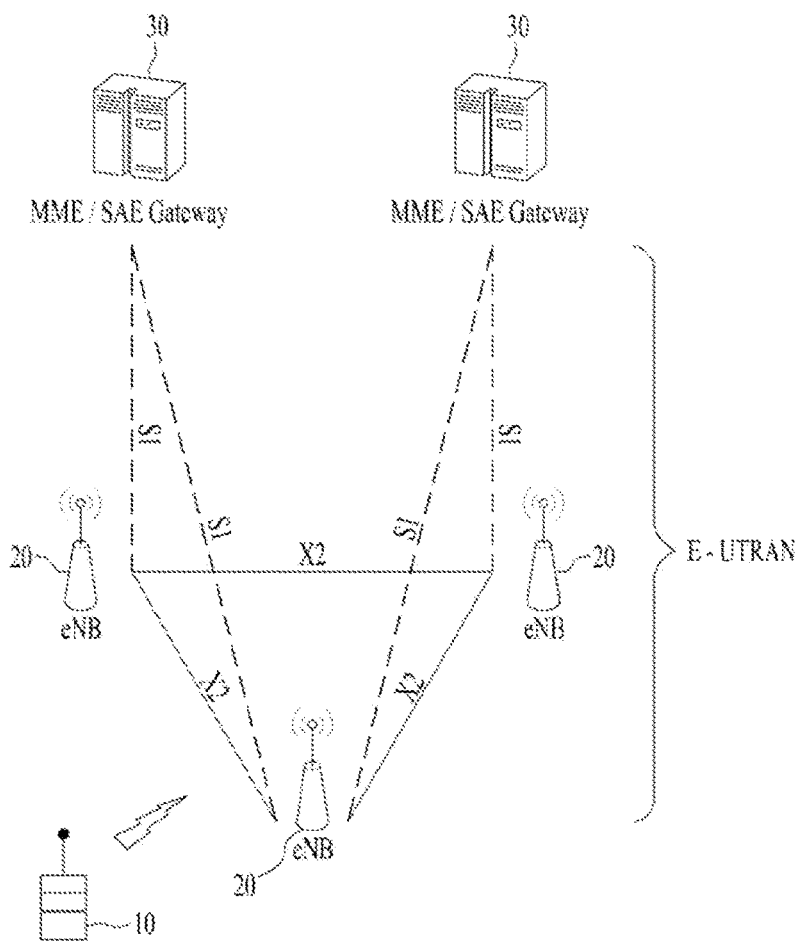
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2b is a block diagram depicting architecture of a typical E-UTRAN and a typical EPC.

As illustrated in FIG. 2b, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
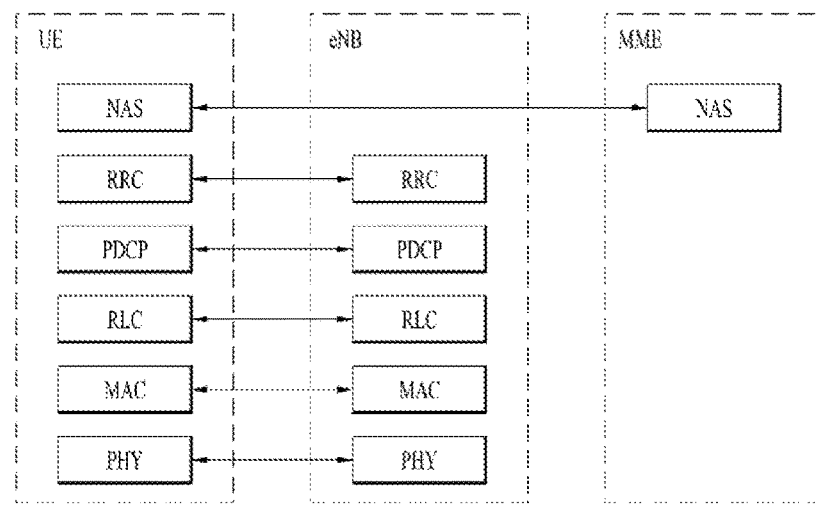
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
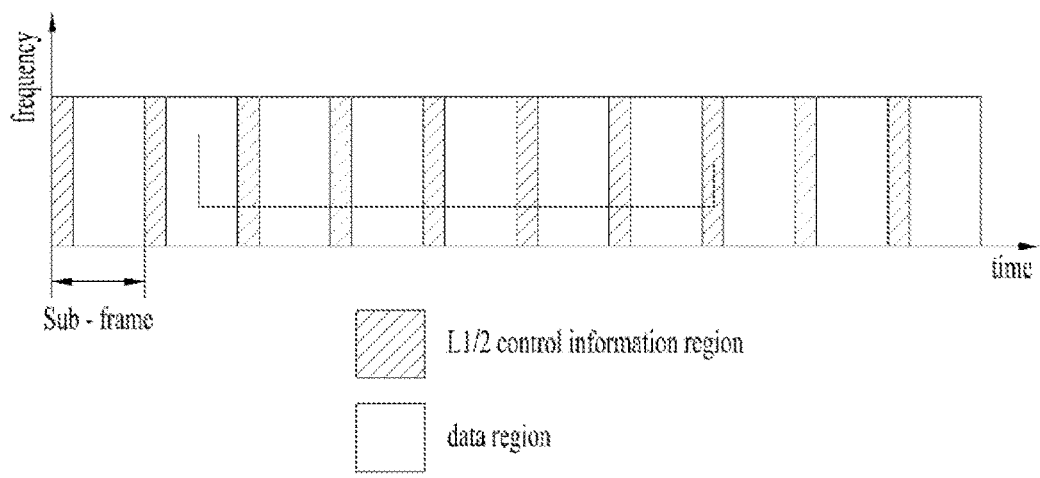
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
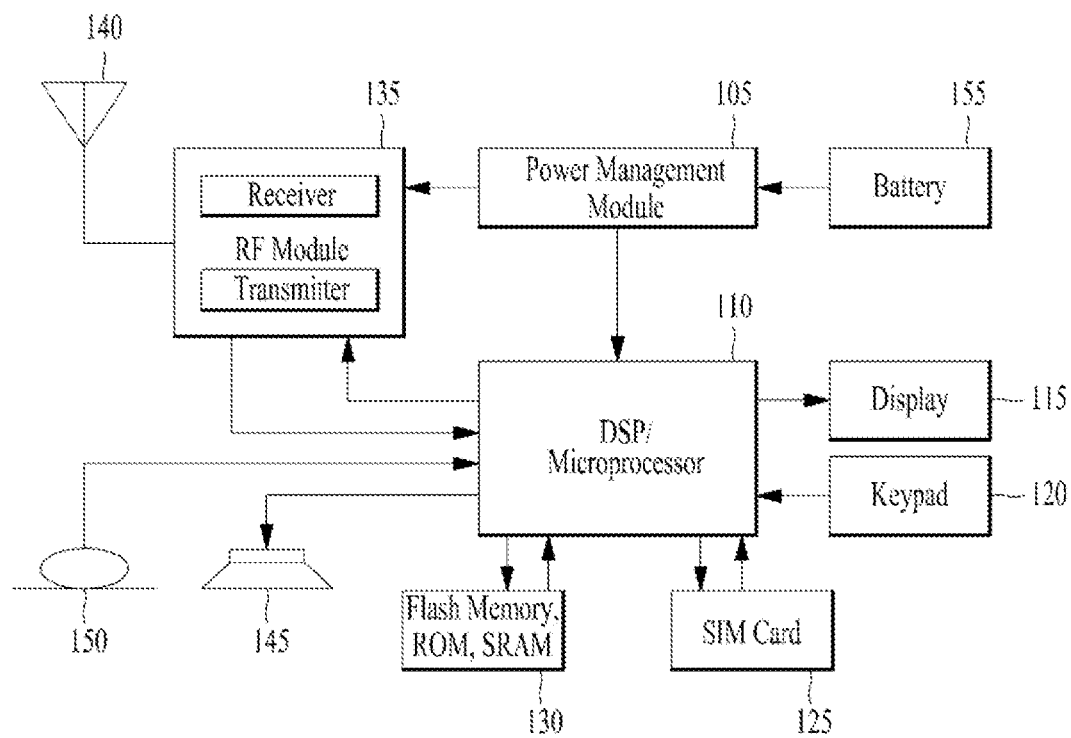
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver;

135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
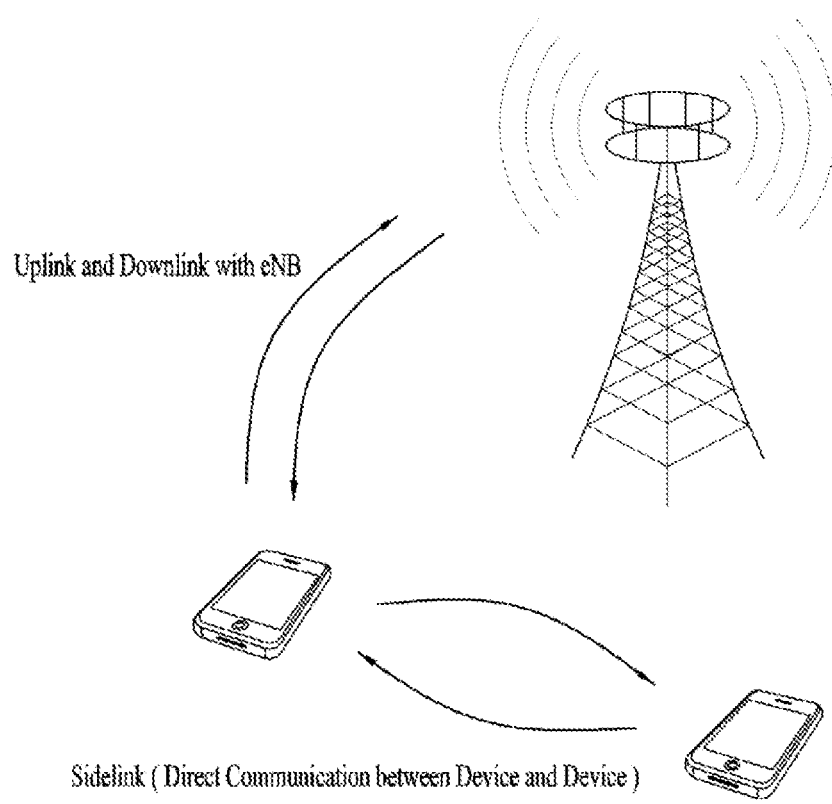
FIG. 6 is a conceptual diagram for sidelink communication.

FIG. 6 is a conceptual diagram for sidelink communication.

Sidelink comprises sidelink discovery, sidelink communication and V2X sidelink communication between UEs. Sidelink uses uplink resources and physical channel structure similar to uplink transmissions. However, some changes, noted below, are made to the physical channels. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe. For V2X sidelink communication, PSCCH and PSSCH are transmitted in the same subframe. The sidelink physical layer processing of transport channels differs from UL transmission in the following steps: for PSDCH and PSCCH, the scrambling is not UE-specific; and modulation of 64 QAM and 256 QAM is not supported for sidelink PSCCH is mapped to the sidelink control resources. PSCCH indicates resource and other transmission parameters used by a UE for PSSCH. For PSDCH, PSCCH and PSSCH demodulation, reference signals similar to uplink demodulation reference signals are transmitted in the 4-th symbol of the slot in normal CP and in the 3rd symbol of the slot in extended cyclic prefix. The sidelink demodulation reference signals sequence length equals the size (number of sub-carriers) of the assigned resource. For V2X sidelink communication, reference signals are transmitted in 3rd and 6th symbols of the first slot and 2nd and 5th symbols of the second slot in normal CP. For PSDCH and PSCCH, reference signals are created based on a fixed base sequence, cyclic shift and orthogonal cover code. For V2X sidelink communication, cyclic shift for PSCCH is randomly selected in each transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorised to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

Figure 7A:
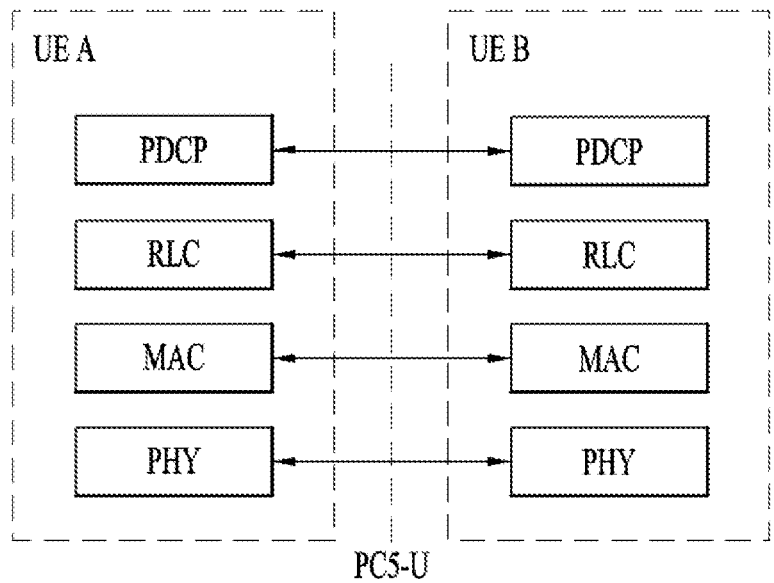
FIG. 7a is a diagram for protocol stack for the user plane of sidelink communication.
Figure 7B:
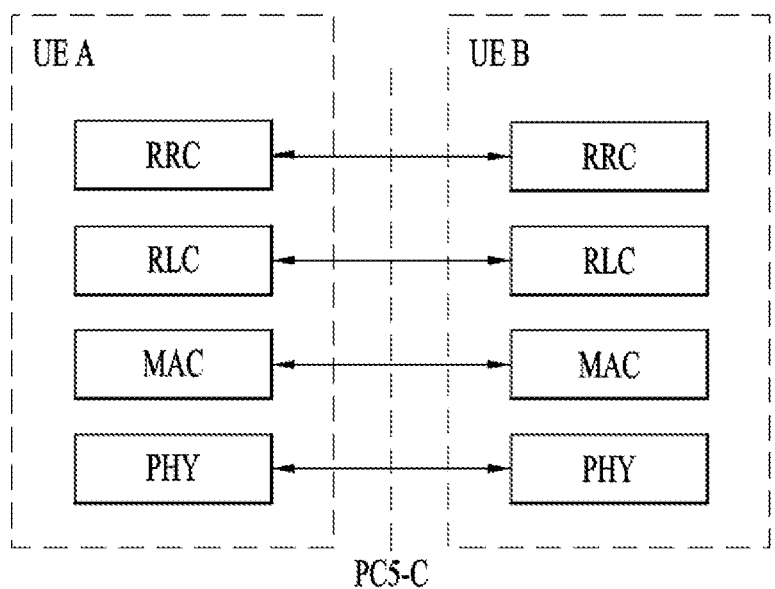
FIGS. 7b and 7c are diagrams for protocol stack for the control plane of sidelink communication.
Figure 7C:
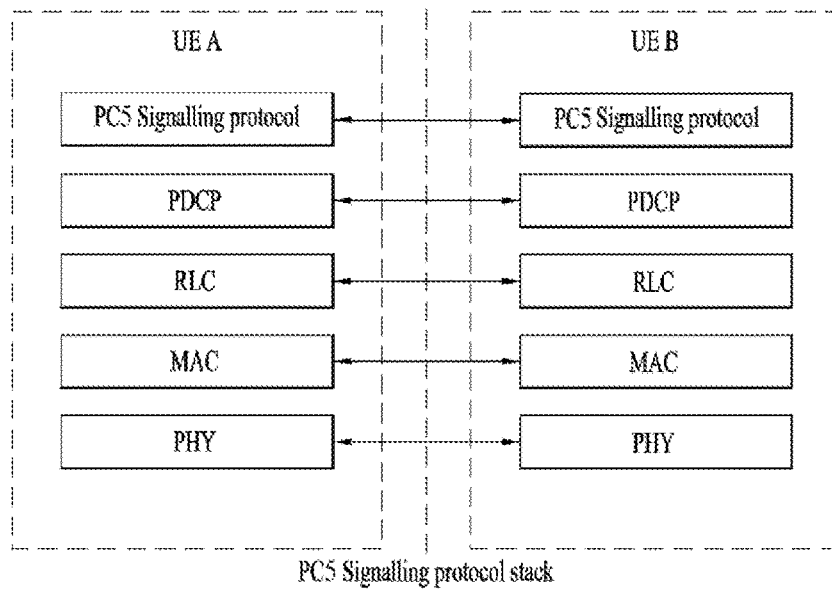

FIG. 7a is a diagram for protocol stack for the user plane of sidelink communication, FIGS. 7b and 7c are diagrams for protocol stack for the control plane of sidelink communication.

FIG. 7a shows the protocol stack for the user plane, where PDCP, RLC and MAC sublayers (terminate at the other UE) perform the functions listed for the user plane. The Access Stratum protocol stack in the PC5 interface consists of PDCP, RLC, MAC and PHY as shown below in FIG. 7a.

User plane details of sidelink communication: i) there is no HARQ feedback for sidelink communication; ii) RLC UM is used for sidelink communication; iii) a receiving UE needs to maintain at least one RLC UM entity per transmitting peer UE; iv) a receiving RLC UM entity used for sidelink communication does not need to be configured prior to reception of the first RLC UMD PDU; v) a ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH (Sidelink Broadcast Control Channel) in the PC5 interface consists of RRC, RLC, MAC and PHY as shown below in FIG. 7b.

The control plane for establishing, maintaining and releasing the logical connection for one-to-one sidelink communication is shown in FIG. 7c.

The UE performs transmission and reception over Uu and PC5 with the following decreasing priority order in case Sidelink Discovery Gap is not configured:
 i) Uu transmission/reception (highest priority);
 ii) PC5 sidelink communication transmission/reception;

iii) PC5 sidelink discovery announcement/monitoring (lowest priority).

The UE performs transmission and reception over Uu and PC5 with the following decreasing priority order in case Sidelink Discovery Gap is configured:

i) Uu transmission/reception for RACH;
ii) PC5 sidelink discovery announcement during a Sidelink Discovery Gap for transmission;
iii) Non-RACH Uu transmission;
iv) PC5 sidelink discovery monitoring during a Sidelink Discovery Gap for reception;
v) Non-RACH Uu reception;
vi) PC5 sidelink communication transmission/reception.

Figure 8:
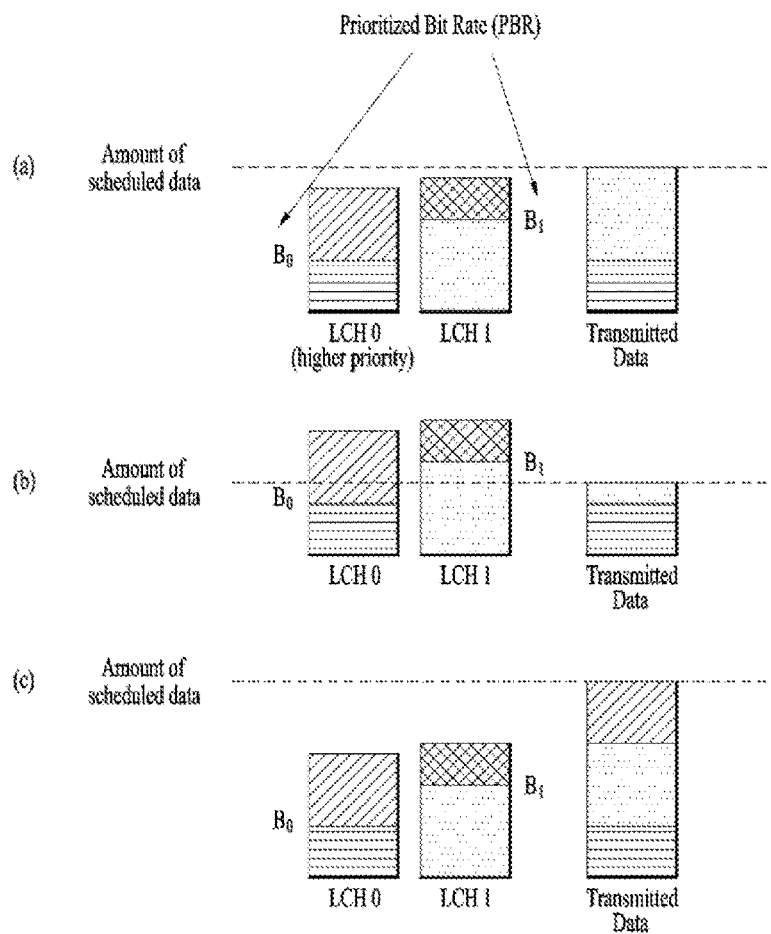
FIG. 8 is an example for performing a Logical Channel Prioritization procedure when a new transmission is performed.
Figure 9A:
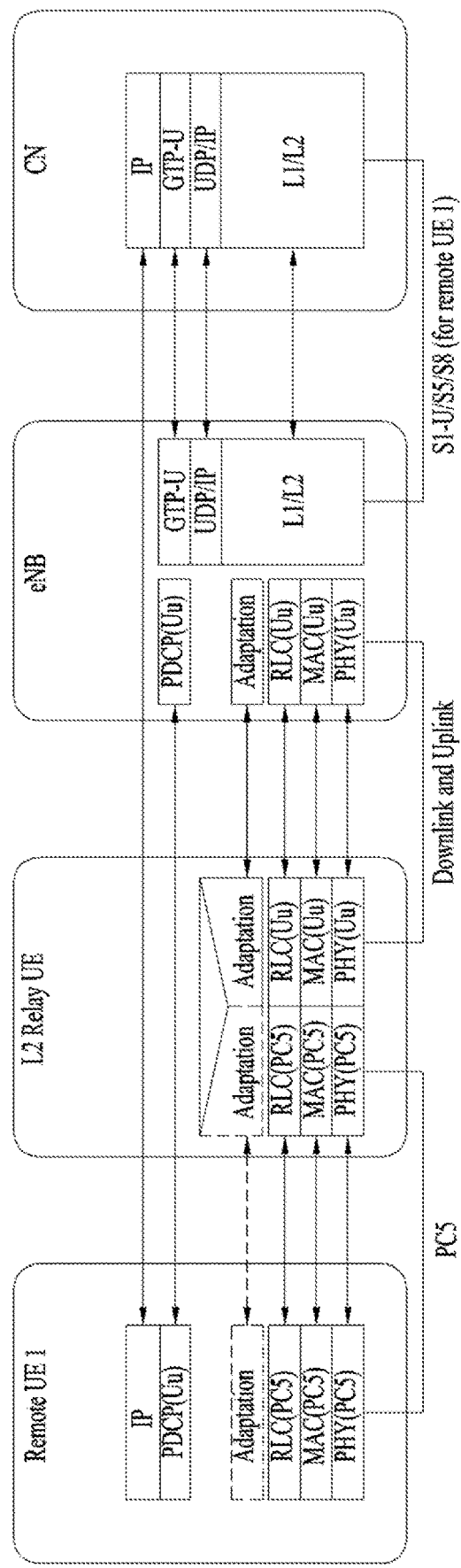
FIGS. 9a to 9d are examples for radio protocol stacks for Layer-2 evolved UE-to-Network relay.
Figure 9B:
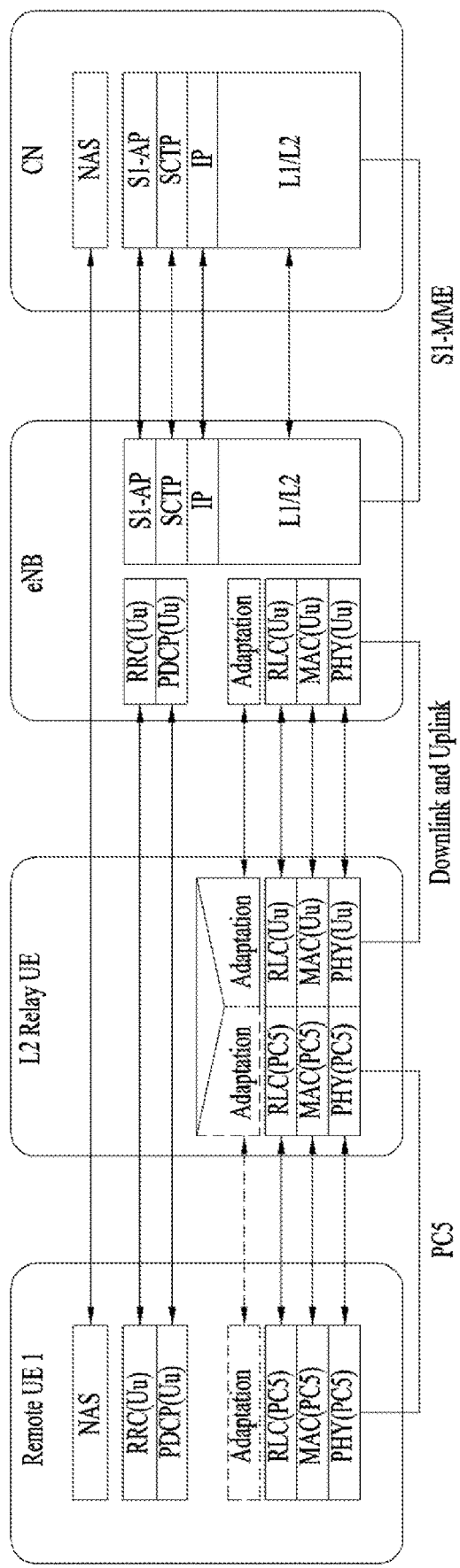
Figure 9C:
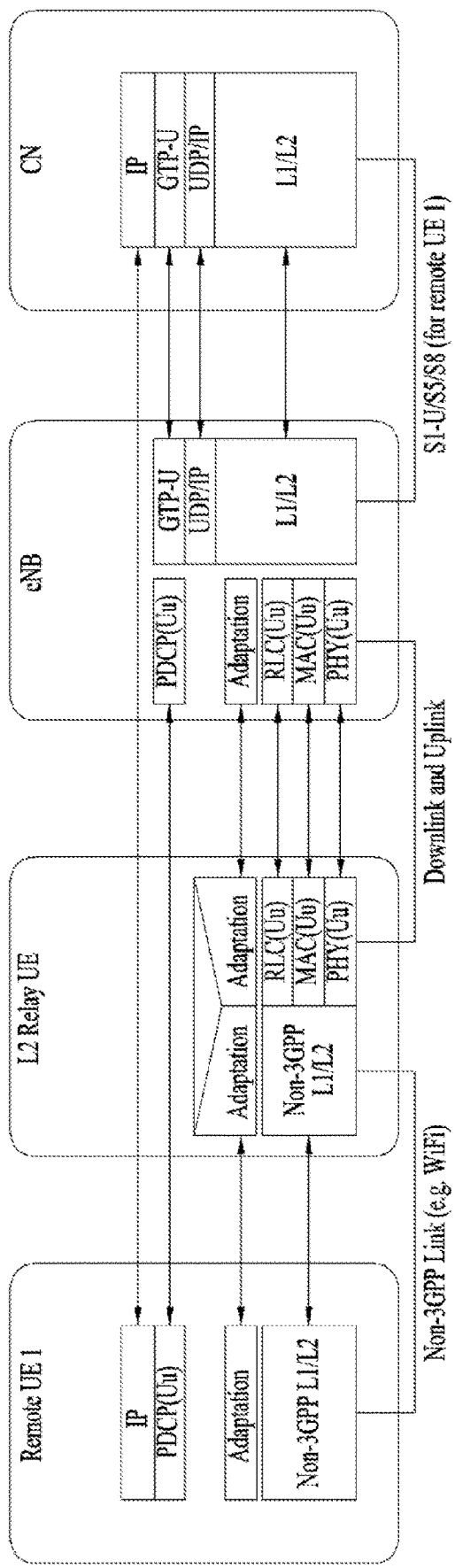
Figure 9D:
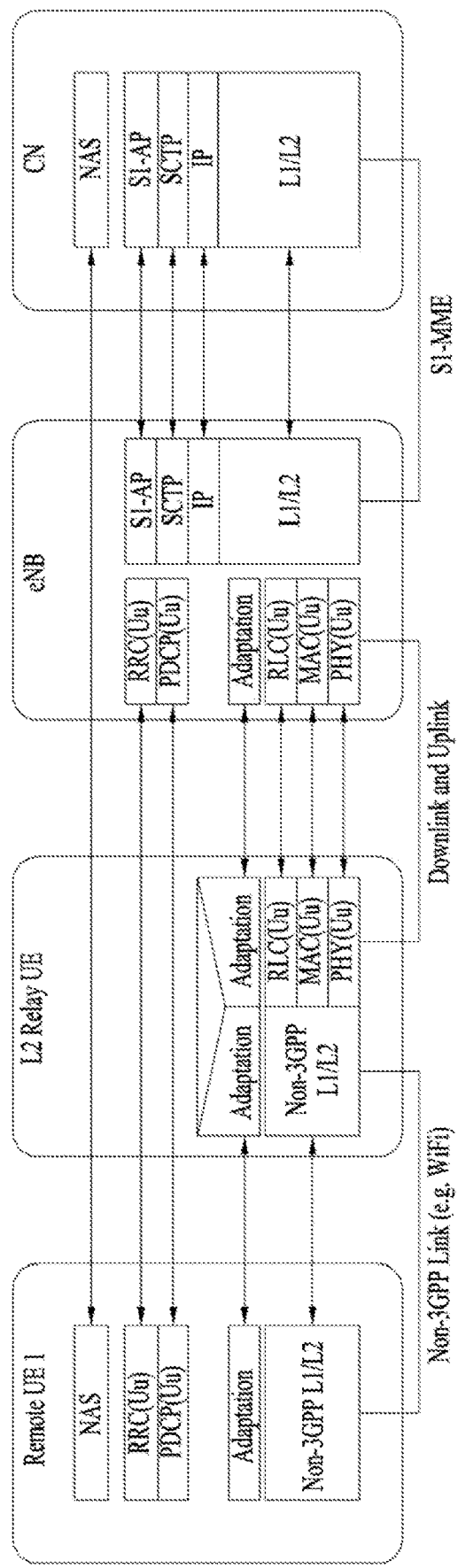

FIG. 8 is an example for performing a Logical Channel Prioritization procedure when a new transmission is performed;

Multiple logical channels of different priorities can be multiplexed into the same transport block using the same MAC multiplexing functionality as in the downlink. However, unlike the downlink case, where the prioritization is under control of the scheduler and up to the implementation, the uplink multiplexing is done according to a set of well-defined rules in the terminal as a scheduling grant applies to a specific uplink carrier of a terminal, not to a specific radio bearer within the terminal. Using radio-bearer-specific scheduling grants would increase the control signaling overhead in the downlink and hence per-terminal scheduling is used in LTE.

The simplest multiplexing rule would be to serve logical channels in strict priority order. However, this may result in starvation of lower-priority channels; all resources would be given to the high-priority channel until its transmission buffer is empty. Typically, an operator would instead like to provide at least some throughput for low-priority services as well. Therefore, for each logical channel in an LTE terminal, a prioritized data rate is configured in addition to the priority value. The logical channels are then served in decreasing priority order up to their prioritized data rate (Prioritized Bit Rate, PRB), which avoids starvation as long as the scheduled data rate is at least as large as the sum of the prioritized data rates. Beyond the prioritized bit rates, channels are served in strict priority order until the grant is fully exploited or the buffer is empty. This is a Logical Channel Prioritization (LCP) procedure, as illustrated in FIG. 8.

The LCP procedure is used for MAC PDU construction by deciding the amount of data from each logical channel and the type of MAC Control Element that should be included in the MAC PDU. Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

Rather than applying the above PBR requirements for every subframe, it is better to meet the PBR requirements for a long time period. To reduce the overhead and to prevent too much segmentation, the token bucket model with PBR is applied. In the token-bucket model, each logical channel is associated with two parameters: bucketSizeDuration and prioritizedBitRate.

In this model, it is assumed that each logical channel is given a right to transmit a prioritizedBitRate amount of data in every subframe. If a certain logical channel has not fully used the right to transmit its prioritizedBitRate amount of data in a certain subframe, the remaining right can be used in another subframe. The right to transmit can be accumulated up to a (prioritizedBitRatexbucketSizeDuration) amount of data. When some data for the logical channel are included in a MAC PDU, the right to transmit is decreased by the amount of data included in the MAC PDU. To prevent a certain logical channel from accumulating too much right to transmit, the parameter bucketSizeDuration sets the limit up to which a logical channel can accumulate the right to transmit. Through this token-bucket model, the UE can meet the PBR principle on average for a longer time period, not per subframe.

As shown FIGS. 8a to 8c, it is assumed data priority of the LCH 0 is higher than a priority of the LCH 1, and PBR of LCH0 is $B_0$, and PBR of LCH1 is $B_1$.

In case of FIG. 8a, if the amount of scheduled data is enough to include an amount of blue of LCH 1, the UE can transmit data including red of LCH 0 and blue of LCH 1 as much as the amount of scheduled data.

In case of FIG. 8b, if the amount of scheduled data is not enough to include an amount of blue of LCH 1, the UE may first generate data including the red of LCH0 and may only include the data including the blue of LCH1 up to the amount of scheduled data.

In case of FIG. 8c, if UL grants are sufficient after generating data by including red of LCH 0 and blue of LCH 1, the UE can includes data of the hatched portion of LCH0 as much as the remaining grants since the priority of the LCH 0 is higher than a priority of the LCH 1.

FIGS. 9a to 9d are examples for radio protocol stacks for Layer-2 evolved UE-to-Network relay.

In FIGS. 9a to 9d, a protocol architecture for supporting Layer 2 evolved UE-to-Network Relay UE is given for the user plane and the control plane.

For protocol architecture for the user plane and control plane, relaying is performed above RLC sublayer. The evolved ProSe Remote UE's user plane and control plane data are relayed above RLC via the evolved ProSe UE-to-Network Relay UE from the evolved ProSe Remote UE to network and vice versa. Uu PDCP and RRC are terminated between the evolved ProSe Remote UE and the eNB while RLC, MAC and PHY and the non-3GPP transport layers are terminated in each link (i.e. the link between the evolved ProSe Remote UE and the evolved ProSe UE-to-Network Relay UE and the link between the evolved ProSe UE-to-Network Relay UE and the eNB). The user plane protocol stack and the control plane protocol stack when PC5 is used between the evolved ProSe remote UE and the evolved ProSe UE-to-Network Relay UE is shown in FIG. 8a and FIG. 8b. The user plane protocol stack and the control plane protocol stack when non-3GPP access is used between the evolved ProSe remote UE and the evolved ProSe UE-to-Network Relay UE is shown in FIG. 8c and FIG. 8d.

When PC5 interface is used between the evolved ProSe remote UE and the evolved ProSe UE-to-Network Relay UE, by introducing a relay UE for UE-to-network relay, a Remote UE transmits data to an eNB via the Relay UE, and the eNB transmits data to the Remote UE via the Relay UE. I.e., the Relay UE relays data to/from eNB.

As data transfer between the remote UE and the Relay UE is ProSe communication, the Relay UE is communicating with the Remote UE over PC5 interface. In the meantime, as data transfer between the Relay UE and the eNB is a normal uplink/downlink (Uu) communication, the Relay UE is communicating with the eNB over Uu interface.

A ProSe UE-to-Network Relay provides a generic L3 forwarding function that can relay any type of IP traffic between the Remote UE and the network. One-to-one and one-to-many sidelink communications are used between the Remote UE(s) and the ProSe UE-to-Network Relay. For both Remote UE and Relay UE only one single carrier (i.e., Public Safety ProSe Carrier) operation is supported (i.e., Uu and PC5 should be same carrier for Relay/Remote UE). The Remote UE is authorised by upper layers and can be in-coverage of the Public Safety ProSe Carrier or out-of-coverage on any supported carriers including Public Safety ProSe Carrier for UE-to-Network Relay discovery, (re) selection and communication. The ProSe UE-to-Network Relay is always in-coverage of EUTRAN. The ProSe UE-to-Network Relay and the Remote UE perform sidelink communication and sidelink discovery.

A ProSe UE-to-Network Relay performing sidelink communication for ProSe UE-to-Network Relay operation has to be in RRC_CONNECTED. After receiving a layer-2 link establishment request or TMGI monitoring request (upper layer message) from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The Remote UE can decide when to start monitoring for ProSe UE-to-Network Relay discovery. The Remote UE can transmit ProSe UE-to-Network Relay discovery solicitation messages while in RRC_IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide, transmission resources using broadcast or dedicated signalling and reception resources using broadcast signalling for ProSe UE-to-Network Relay Operation. The Remote UE stops using ProSe UE-to-Network Relay discovery and communication resources when RSRP goes above the broadcasted threshold.

The Remote UE performs radio measurements at PC5 interface and uses them for ProSe UE-to-Network Relay selection and reselection along with higher layer criterion. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays. Traffic of one or multiple evolved ProSe Remote UEs may be mapped to a single DRB of Uu interface of the evolved ProSe UE-to-Network Relay UE. Multiple Uu DRBs may be used to carry traffic of different QoS classes, for one or multiple evolved ProSe Remote UEs. It is also possible to multiplex traffic of evolved ProSe UE-to-Network Relay UE itself onto the Uu DRB, which is used to relay traffic to/from evolved ProSe Remote UEs. How the mapping of the traffic between sidelink bearers and Uu bearers is done is up to the eNB implementation and the mapping is configured in evolved ProSe UE-to-Network Relay UE by the eNB. An adaptation layer over Uu is supported to identify the evolved ProSe Remote UE/evolved ProSe UE-to-Network Relay UE and the corresponding.

Traffic of one or multiple evolved ProSe Remote UEs may be mapped to a single DRB of Uu interface of the evolved ProSe UE-to-Network Relay UE. Multiple Uu DRBs may be used to carry traffic of different QoS classes, for one or multiple evolved ProSe Remote UEs. It is also possible to multiplex traffic of evolved ProSe UE-to-Network Relay UE itself onto the Uu DRB, which is used to relay traffic to/from evolved ProSe Remote UEs. How the mapping of the traffic between sidelink bearers and Uu bearers is done is up to the eNB implementation and the mapping is configured in evolved ProSe UE-to-Network Relay UE by the eNB. An adaptation layer over Uu is supported to identify the evolved ProSe Remote UE/evolved ProSe UE-to-Network Relay UE and the corresponding.

Within a Uu DRB, different evolved ProSe Remote UEs and different bearers of the evolved ProSe Remote UE are indicated by additional information included in adaptation layer header which is added to PDCP PDU.

Since the data of relay UE and remote UE are multiplexed within one DRB or SRB, in order to prevent the data or signaling of relay UE from being deprioritized, a new priority definition between the data or signaling of the remote UE and the data or signaling of the relay UE is needed.

In MAC specification, for Logical Channel Prioritization (LCP) procedure, the relative priority is defined as follows (Highest to Lowest);

MAC CE for C-RNTI or data from UL-CCCH;
MAC control element for SPS confirmation;
MAC CE for BSR, with the exception of BSR included for padding;
MAC CE for PHR;
MAC control element for Sidelink BSR, with exception of Sidelink BSR included for padding
Data from any logical channel, except data from UL-CCCH;
MAC CE for padding BSR.

This invention introduces how to prioritize the traffic of the relay UE over one of the remote UE at the relay UE during logical channel prioritization for transmission over Uu interface via relay UE's signaling/data radio bearer.

More specifically, in this application, we discuss how the UE handles relay UE traffic and remote UE traffic in LCP procedure. It is proposed of basic principle of logical channel prioritization procedure for relay UE traffic and remote UE traffic at the relay UE. During LCP procedure at relay UE, the MAC entity shall take into account relay UE traffic prioritized over remote UE traffic. However, if relay UE traffic absolutely takes precedence over remote UE traffic, transmission of the remote UE traffic can be continuously dropped. New definitions are needed to ensure remote traffic transmission.

Figure 10:
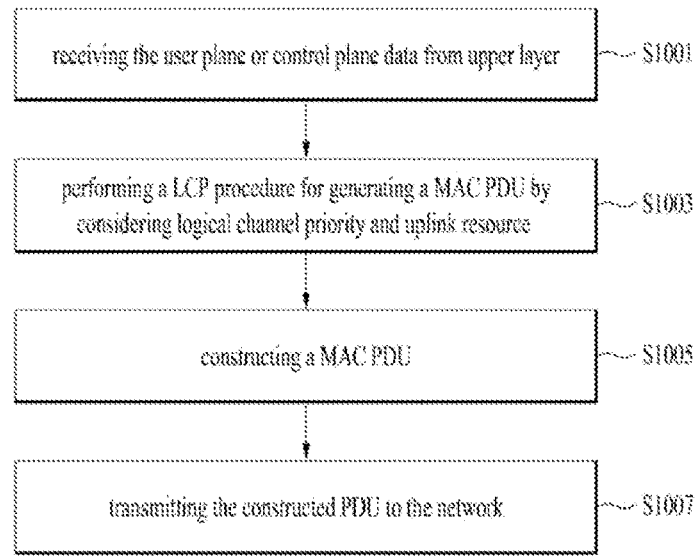
FIG. 10 is a conceptual diagram for performing a LCP procedure by a Relay UE in wireless communication system according to embodiments of the present invention.

FIG. 10 is a conceptual diagram for performing a LCP procedure by a Relay UE in wireless communication system according to embodiments of the present invention.

In the methods below, it is assumed that the relay UE is layer 2 relay and the remote UE is linked with the relay UE. The remote UE transmits user plane/control plane data via the linked relay UE.

In this method, it is assumed that two types of bearers are established at relay UE. One is Uu bearers for the remote UE and another is Uu bearers for relay UE. In other words, SRB/DRB for remote UE and SRB/DRB for relay UE itself are established at the relay UE for Uu transmission.

Then, there are some options that the MAC entity shall take into account one or more followings during a LCP procedure:

i) the data from UL-CCCH of relay UE is prioritized over any data of remote UE, and/or ii) if it is assumed that there is UL-CCCH for remote UE in Uu interface, the data from UL-CCCH of the remote UE is prioritized over any data from any Logical Channel, except data from UL-CCCH of the relay UE, and/or iii) the data from any Logical Channel of one priority of the relay UE is prioritized over data from any Logical channel of the same priority of the remote UE, and/or iv) any user plane/control plane data of the relay UE is prioritized over any data/signaling of the remote UE, and/or user plane data of the relay UE is prioritized over one of the remote UE; and/or v) the higher priority data from any Logical Channel regardless of remote UE and relay UE is prioritized; and/or control plane data of the relay UE is prioritized over one of the remote UE; and/or vi) control plane data of the relay UE is prioritized over user plane data of the remote UE; and/or vii) control plane data of the remote UE is prioritized over user plane data of the relay UE.

When the relay UE receives the user plane or control plane data from upper layer of the relay UE (S1001), the UE performs a LCP procedure for generating a MAC PDU by considering logical channel priority and uplink resource (S1003).

During Logical Channel Prioritization procedure at the relay for the transmission over Uu bearer of the relay UE, the MAC entity shall take into account the following relative priority in decreasing order (Highest to Lowest):

In Case 1 and Case 2, it is assumed that the SRB0 (corresponding to UL-CCCH) of relay UE and the SRB0 of remote UE in the relay UE are different. Dedicated DRBs for the remote UE in the relay UE are assumed to be not present. Even if the dedicated DRBs are assumed, there is no different handling between the data (except data of UL-CCCH) from logical channel of remote UE and the relay UE.

In Case 3 and Case 4, it is assumed that the radio bearers of relay UE and the radio bearers of remote UE in the relay UE are different. With this embodiment, it would have effect that uplink of relay UE is preferentially managed so that the relay UE could communicate with the network stably for the remote UE as well as relay UE itself. In addition, the ongoing activity via sidelink is preferentially served over newly generated traffic/call considering that guaranteeing the QoS of the on-going traffic is more important than the QoS of the newly generate traffic. The effects of the following Case 2 and Case 3 in LCP procedure are same.

[Case 1]

MAC control element for C-RNTI or data from UL-CCCH of relay UE;
data from UL-CCCH of remote UE;
MAC control element for SPS confirmation;
MAC control element for BSR, with exception of BSR included for padding;
MAC control element for PHR, Extended PHR, or Dual Connectivity PHR;
MAC control element for Sidelink BSR, with exception of Sidelink BSR included for padding;
data from any Logical Channel, except data from UL-CCCH;
MAC control element for BSR included for padding;
MAC control element for Sidelink BSR included for padding.

With this method, by ensuring that the data from the UL-CCCH of the remote UE has a higher priority than all information except the data received from the UL-CCCH of the relay, a delay taken for establishing RRC connection of remote UE is reduced.

[Case 2]

MAC control element for C-RNTI or data from UL-CCCH of relay UE;
MAC control element for SPS confirmation;
MAC control element for BSR, with exception of BSR included for padding;
MAC control element for PHR, Extended PHR, or Dual Connectivity PHR;
MAC control element for Sidelink BSR, with exception of Sidelink BSR included for padding;
data from UL-CCCH of remote UE;
data from any Logical Channel, except data from UL-CCCH;
MAC control element for BSR included for padding;
MAC control element for Sidelink BSR included for padding.

With the Case 2, a delay taken for establishing RRC connection of remote UE is reduced while a procedure for maintaining Uu link of the relay UE is prioritized so that the signalling/data of the relay UE as well as remote UE is transmitted over Uu link stably.

[Case 3]

MAC control element for C-RNTI or data from UL-CCCH of relay UE;
MAC control element for SPS confirmation;
MAC control element for BSR, with exception of BSR included for padding;
MAC control element for PHR, Extended PHR, or Dual Connectivity PHR;
MAC control element for Sidelink BSR, with exception of Sidelink BSR included for padding;
data from any Logical Channel, except data from UL-CCCH of relay UE (in this case 3, the data from UL-CCCH of the remote UE is prioritized over any data from any Logical Channel, except data from UL-CCCH of the relay UE. And the higher priority data from any Logical Channel regardless of remote UE and relay UE is prioritized. The data from any Logical Channel of one priority of the relay UE is prioritized over data from any Logical Channel of the same priority of the remote UE);
MAC control element for BSR included for padding;
MAC control element for Sidelink BSR included for padding.

[Case 4]

MAC control element for C-RNTI or data from UL-CCCH of relay UE;
MAC control element for SPS confirmation;
MAC control element for BSR, with exception of BSR included for padding;
MAC control element for PHR, Extended PHR, or Dual Connectivity PHR;
MAC control element for Sidelink BSR, with exception of Sidelink BSR included for padding;
data from UL-CCCH of the remote UE data from any Logical Channel, except data from UL-CCCH of relay UE and remote UE (In this case 4, the higher priority data from any Logical Channel regardless of remote UE and relay UE is prioritized. And data from any Logical Channel of one priority of the relay UE is prioritized over data from any Logical Channel of the same priority of the remote UE);

MAC control element for BSR included for padding;

MAC control element for Sidelink BSR included for padding.

With the Case 3 and 4, a delay taken for establishing RRC connection of remote UE is reduced while a procedure for maintaining Uu link of the relay UE is prioritized so that the signalling/data of the relay UE as well as remote UE is transmitted over Uu link stably. In addition, if data radio bearers for relay UE and remote UE over Uu are different, this method provides a way to different prioritized handling of bearers of relay UE and remote UE.

[Case 5]

MAC control element for C-RNTI or data from UL-CCCH of relay UE;

MAC control element for SPS confirmation;

MAC control element for BSR, with exception of BSR included for padding;

MAC control element for PHR, Extended PHR, or Dual Connectivity PHR;

MAC control element for Sidelink BSR (only in case the PPPP of the buffered data is equal to and/or below the threshold), with exception of Sidelink BSR included for padding;

data from UL-CCCH of the remote UE;

MAC control element for Sidelink BSR (in case the PPPP of the buffered data is above the threshold), with exception of Sidelink BSR included for padding;

data from any Logical Channel, except data from UL-CCCH of relay UE and remote UE (in this case 5, the higher priority data from any Logical Channel regardless of remote UE and relay UE is prioritized, and data from any Logical Channel of one priority of the relay UE is prioritized over data from any Logical Channel of the same priority of the remote UE);

MAC control element for BSR included for padding;

MAC control element for Sidelink BSR included for padding.

In this Case 5, depending on a (pre)configured threshold and the logical channel priority/PPPP of the buffered data, it is determined that the data from UL-CCCH is prioritized over Sidelink BSR or not. If the PPPP of the buffered data is equal to and/or below the threshold (or the logical channel priority is equal to and/or above the threshold), the sidelink BSR is prioritized. Otherwise, the UL-CCCH of the remote UE is prioritized over sidelink BSR.

With this Case 5, the network is able to prioritize the important on-going sidelink traffic over new RRC connection of the new remote UE while the less important on-going sidelink traffic could be deprioritized over new RRC connection of the new remote UE.

More specifically, in the LCP procedure, the UE allocates an uplink resource to first information having a first priority which is highest priority and a corresponding MAC sub-header in the MAC PDU, and then checks whether a remaining uplink resource in the MAC PDU can accommodate second information having a second priority which is lower than the first priority and a corresponding MAC sub-header.

If the remaining uplink resource can accommodate the second information and a corresponding MAC sub-header, the UE can allocate an uplink resource to the second information and a corresponding MAC sub-header. If there is no remaining uplink resource after the UE allocates an uplink resource to second information and a corresponding MAC sub-header in the MAC PDU, the UE cannot allocate an uplink resource to the second information and a corresponding MAC sub-header.

If the remaining uplink resource can accommodate third information having a third priority which is lower than the second priority and a corresponding MAC sub-header, the UE can allocate an uplink resource to the third information and a corresponding MAC sub-header.

Based on the above LCP procedure, the relay UE constructs a MAC PDU (S1005) and transmits the constructed PDU to the network (S1007).

Figure 11:
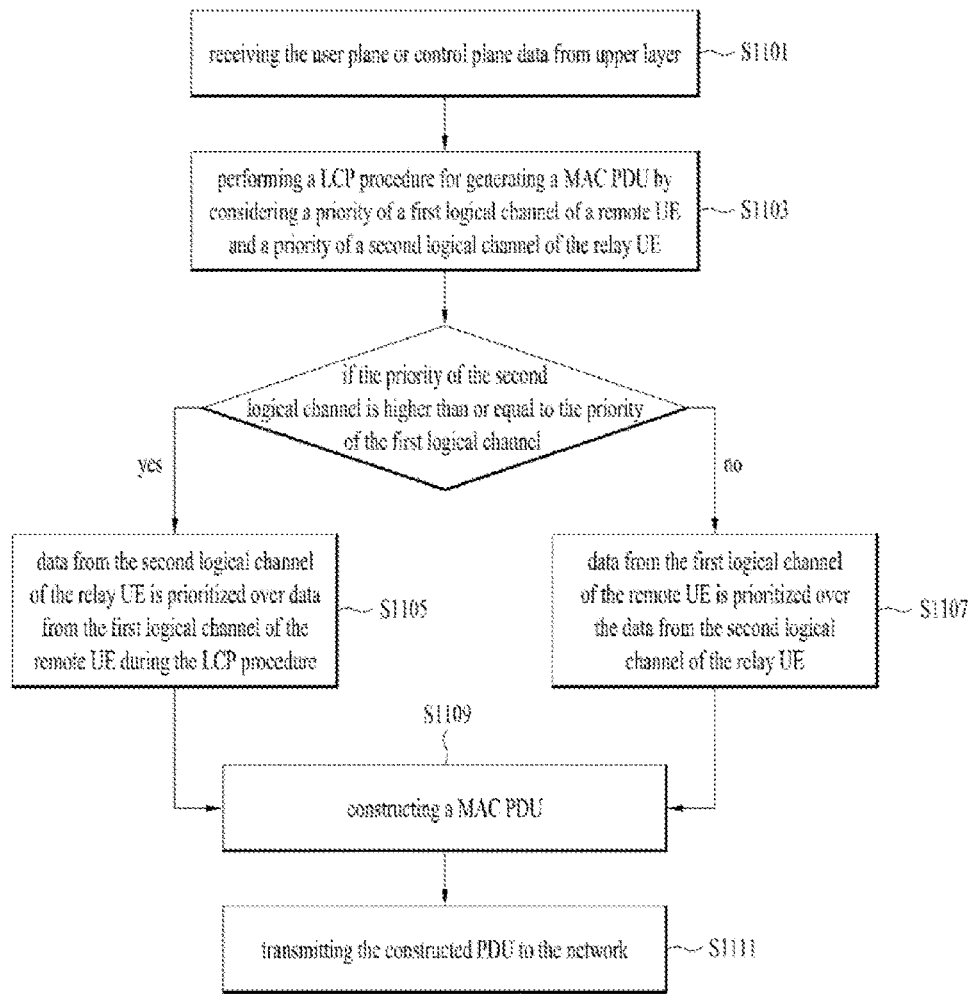
FIG. 11 is an example for performing a LCP procedure by a Relay UE in wireless communication system according to embodiments of the present invention.

FIG. 11 is an example for performing a LCP procedure by a Relay UE in wireless communication system according to embodiments of the present invention.

This is an example for Case 3, as above mentioned.

When the relay UE receives the user plane or control plane data from an upper layer of the relay UE (S1101), the UE performs a LCP procedure for generating a MAC PDU by considering a priority of a first logical channel of a remote UE and a priority of a second logical channel of the relay UE (S1103).

Firstly, the UE allocates an uplink resource to data from UL-CCCH of relay UE and a corresponding a sub header in the MAC PDU, and if there are signaling information for Uu link of the relay UE, the UE allocates the remaining uplink resource to data from signaling information for Uu link of relay UE and a corresponding a sub header in the MAC PDU. The remaining uplink resource is resource after allocating data from UL-CCCH of relay UE and a corresponding a sub header in the MAC PDU.

Basically, in case of data from any Logical Channel, except data from UL-CCCH of relay UE, the higher priority data from any Logical Channel regardless of remote UE and relay UE is prioritized. However, the data from UL-CCCH of the remote UE is prioritized over any data from any Logical Channel, except data from UL-CCCH of the relay UE for reducing delay taken for establishing RRC connection of remote UE.

And, if a priority of a second logical channel of the relay UE is equal to a priority of a first logical channel of the remote UE, data from the second logical channel of the relay UE is prioritized over data from the first logical channel of the remote UE during the LCP procedure (S1105).

When the data from the second logical channel of the relay UE is prioritized over the data from the first logical channel of the remote UE during the LCP procedure, the UE allocates the remaining uplink resource to the data from the second logical channel of the relay UE and a corresponding MAC sub-header in the MAC PDU, and checks whether the remaining uplink resource in the MAC PDU can accommodate the data from the first logical channel of the remote UE and a corresponding MAC sub-header, and allocates the uplink resource to the data from the first logical channel of the remote UE and a corresponding MAC sub-header, if the remaining uplink resource can accommodate the data from the first logical channel of the remote UE and a corresponding MAC sub-header.

And the UE doesn't allocates the uplink resource to the data from the first logical channel of the remote UE and a corresponding MAC sub-header, if the remaining uplink resource cannot accommodate the data from the first logical channel of the remote UE and a corresponding MAC sub-header.

After the UE allocates the first logical channel of the remote UE and a corresponding MAC sub-header in the MAC PDU, the UE allocates a remaining uplink resource in MAC PDU to padding BSR.

If the priority of the first logical channel of the remote UE is higher than the priority of the second logical channel of the relay UE, the data from the first logical channel of the remote UE is prioritized over the data from the second logical channel of the relay UE (S1107).

Based on the above LCP procedure, the relay UE constructs a MAC PDU (S1109) and transmits the constructed PDU to the network (S1111).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method performed by a first wireless node operating in a wireless communication system, the method comprising:
    performing, by the first wireless node, a logical channel prioritization (LCP) procedure for generating a Medium Access Control (MAC) Protocol Data Unit (PDU) by considering a priority of a first logical channel of the first wireless node and a priority of a second logical channel of the first a second wireless node; and
    transmitting the MAC PDU to a network,
    wherein based on the priority of the second logical channel being equal to the priority of the first logical channel, first data from the first logical channel is prioritized over second data from the second logical channel during the LCP procedure based on the second data being transmitted to a base station through the first wireless node,
    wherein the first data is data from the first logical channel except third data from uplink (UL)-Common Control Channel (CCCH) of first wireless node and the second data is data from the second logical channel except fourth data from UL-CCCH of the second wireless node,
    wherein the fourth data is prioritized over a MAC Control Element (CE) related to padding, and a MAC CE not related to padding is prioritized over the fourth data,
    based on the first data being prioritized over the second data during the LCP procedure:
        allocating an uplink resource to the first data and a corresponding first MAC sub-header in the MAC PDU;
        determining whether a remaining uplink resource in the MAC PDU is available to accommodate the second data and a corresponding second MAC sub-header; and
        allocating at least part of the remaining uplink resource to the second data and second MAC sub-header, based on a determination that the remaining uplink resource is available to accommodate the second data and the second MAC sub-header,
    wherein the first wireless node does not allocate the remaining uplink resource to the second data and the second MAC sub-header, based on a determination that the remaining uplink resource is not available to accommodate the second data and the second MAC sub-header.

2. The method according to claim 1, wherein the third data has a highest priority during the LCP procedure.

3. The method according to claim 1, wherein the fourth data is prioritized over any data from any logical channel, except the third data.

4. The method according to claim 1, wherein the first wireless node is capable of communicating with at least one of another UE, a UE related to an autonomous driving vehicle, a base station, the second wireless node or a network.

5. A first wireless node configured to operate in a wireless communication system, the first wireless node comprising:
a Radio Frequency (RF) module; and
a processor operably coupled with the RF module and configured to:
perform a logical channel prioritization (LCP) procedure for generating a Medium Access Control (MAC) Protocol Data Unit (PDU) by considering a priority of a first logical channel of the first wireless node and a priority of a second logical channel of a second wireless node, and
transmit the MAC PDU to a network,
wherein based on the priority of the second logical channel being equal to the priority of the first logical channel, first data from the first logical channel is prioritized over second data from the second logical channel during the LCP procedure based on the second data being transmitted to a base station through the first wireless node,
wherein the first data is data from the first logical channel except third data from uplink (UL)-Common Control Channel (CCCH) of first wireless node and the second data is data from the second logical channel except fourth data from UL-CCCH of the second wireless node,
wherein the fourth data is prioritized over a MAC Control Element (CE) related to padding, and a MAC CE not related to padding is prioritized over the fourth data,
based on the first data being prioritized over the second data during the LCP procedure:
allocating an uplink resource to the first data and a corresponding first MAC sub-header in the MAC PDU;
determining whether a remaining uplink resource in the MAC PDU is available to accommodate the second data and a corresponding second MAC sub-header; and
allocating at least part of the remaining uplink resource to the second data and second MAC sub-header, based on a determination that the remaining uplink resource is available to accommodate the second data and the second MAC sub-header,
wherein the first wireless node does not allocate the remaining uplink resource to the second data and the second MAC sub-header, based on a determination that the remaining uplink resource is not available to accommodate the second data and the second MAC sub-header.

6. The first wireless node according to claim 5, wherein the third data has a highest priority during the LCP procedure.

7. The first wireless node according to claim 5, wherein the fourth data is prioritized over any data from any logical channel, except the third data.

8. The first wireless node according to claim 5, wherein the first wireless node is capable of communicating with at least one of another UE, a UE related to an autonomous driving vehicle, a base station, the second wireless node or a network.

* * * * *